United States Patent
Kim et al.

(10) Patent No.: US 7,289,712 B2
(45) Date of Patent: Oct. 30, 2007

(54) PLANAR OPTICAL WAVEGUIDE AND METHOD OF FABRICATING THE SAME

(75) Inventors: Tae Hong Kim, Daejeon (KR); Jong Jun You, Daejeon (KR); Hee Kyung Sung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 17 days.

(21) Appl. No.: 11/237,223

(22) Filed: Sep. 28, 2005

(65) Prior Publication Data

US 2006/0127022 A1    Jun. 15, 2006

(30) Foreign Application Priority Data

Dec. 9, 2004   (KR) ...................... 10-2004-0103699

(51) Int. Cl.
  *G02B 6/10*   (2006.01)
(52) U.S. Cl. ...................... 385/132; 385/129; 385/130; 385/131
(58) Field of Classification Search ........ 385/129–132; 65/386; 264/1.24; 438/31, 81
  See application file for complete search history.

(56) References Cited

U.S. PATENT DOCUMENTS

| | | | |
|---|---|---|---|
| 5,195,161 A | | 3/1993 | Adar et al. |
| 5,497,445 A | * | 3/1996 | Imoto ......................... 385/143 |
| 5,745,619 A | | 4/1998 | Li et al. |
| 5,930,439 A | | 7/1999 | Ojha et al. |
| 5,991,487 A | * | 11/1999 | Sugiyama .................... 385/129 |
| 6,356,694 B1 | * | 3/2002 | Weber ......................... 385/132 |
| 6,477,308 B2 | | 11/2002 | Hattori et al. |
| 6,487,354 B1 | * | 11/2002 | Ferm et al. ................... 385/129 |
| 6,625,370 B2 | | 9/2003 | Itoh et al. |
| 6,631,235 B1 | | 10/2003 | Kawashima et al. |
| 6,718,109 B1 | | 4/2004 | Bonar et al. |
| 2002/0021879 A1 | | 2/2002 | Lee et al. |
| 2003/0077060 A1 | * | 4/2003 | Chen et al. ................... 385/129 |
| 2003/0099029 A1 | | 5/2003 | Yoon |
| 2003/0152353 A1 | | 8/2003 | Inoue et al. |
| 2003/0190108 A1 | | 10/2003 | Shin et al. |
| 2005/0018988 A1 | * | 1/2005 | Shih et al. ................... 385/129 |
| 2005/0089291 A1 | * | 4/2005 | Yamada ....................... 385/129 |

FOREIGN PATENT DOCUMENTS

JP    3 158802    7/1991

* cited by examiner

*Primary Examiner*—Frank G. Font
*Assistant Examiner*—Charlie Peng
(74) *Attorney, Agent, or Firm*—Ladas & Parry LLP

(57) ABSTRACT

Provided are a planar optical waveguide and a method of fabricating the same which is adapted to a planar optical component and an optical component for use in a optical communication. The planar optical waveguide includes: a lower cladding layer formed on a substrate, a core formed on the lower cladding layer, a dielectric layer covering the core, and an upper cladding layer formed on the lower cladding layer having the dielectric layer. By forming the dielectric layer having a low refractive index between the core and the clad, a difference of refractive indices between the core and the clad increases so that light is densely focused into the core, thereby forming a single mode having a strong energy to minimize a propagation loss.

9 Claims, 6 Drawing Sheets

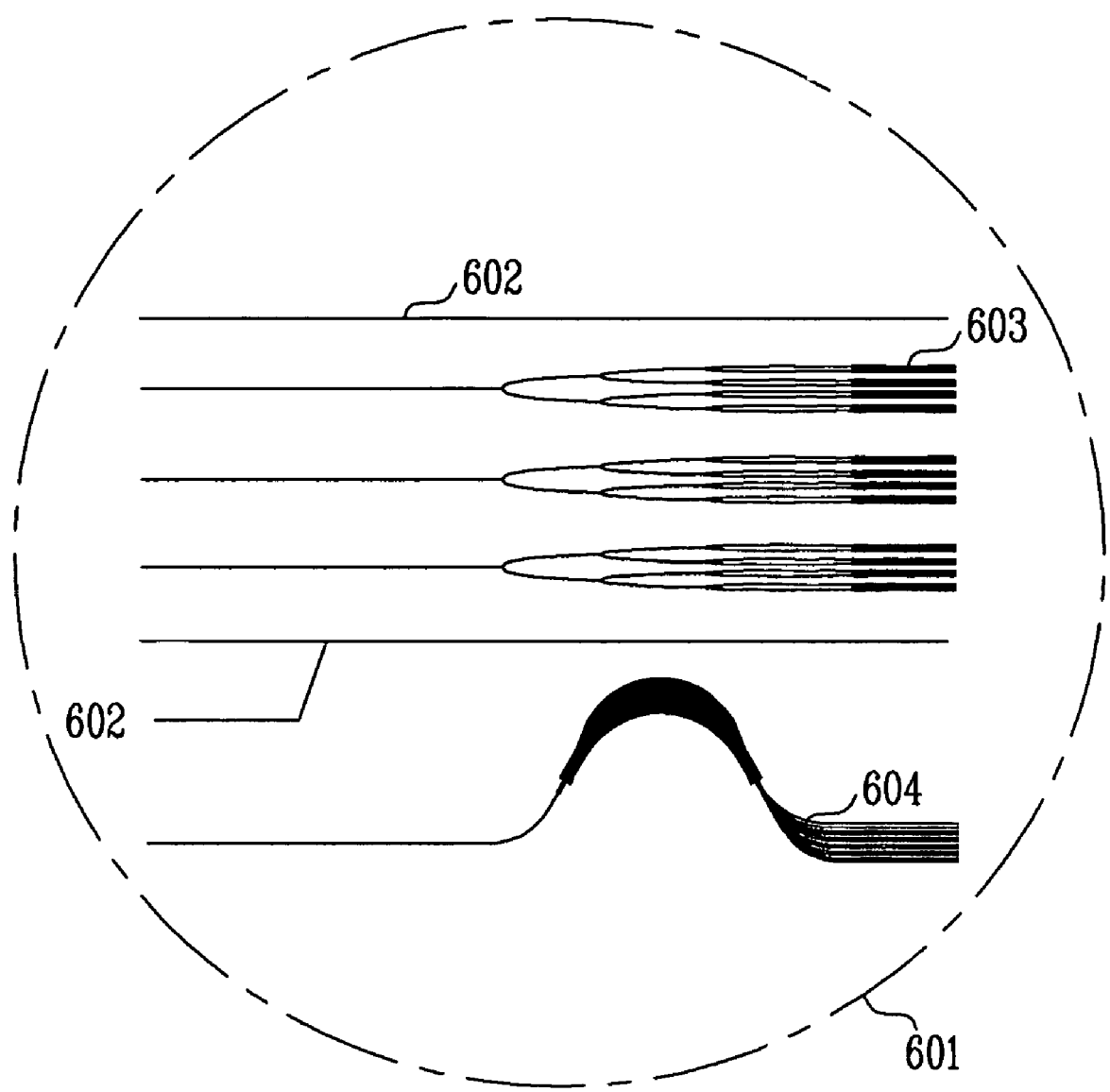

PLANAR OPTICAL WAVEGUIDE AND METHOD OF FABRICATING THE SAME

CROSS-REFERENCE TO RELATED APPLICATION

This application claims priority to and the benefit of Korean Patent Application No. 2004-103699, filed Dec. 9, 2004, the disclosure of which is incorporated herein by reference in its entirety.

BACKGROUND

1. Field of the Invention

The present invention relates to a planar optical waveguide adapted to planar integrated optical parts and an optical module for use in the field of optical communication and a method of fabricating the planar optical waveguide, and more specifically, to a planar optical waveguide and a method of fabricating the planar optical waveguide capable of minimizing a propagation loss.

2. Discussion of Related Art

Optical passive components such as optical dividers, optical couplers, wavelength division multiplexers (WDM), optical filters, optical amplifiers, optical attenuators, and optical switches and optical active components such as light receiving devices and light emitting devices are employed to use optical signals, and an optical platform for integrating the optical passive components and the optical active components and various microwave-photonics optical modules using the optical platform are also used.

An optical waveguide is commonly applied to these components. Conventionally, a fiber optical component fabricated by fusing, coupling, and connecting an optical fiber has been used, but recently, a planar optical waveguide integrating an optical signal transmission path in a planar type using a semiconductor process is used. The planar optical waveguide becomes a basis arrangement in fabricating all planar optical components and optical modules.

FIGS. 1A to 1C are cross sectional views illustrating a method of fabricating a conventional planar optical waveguide.

Referring to FIG. 1A, a lower cladding layer 102 is formed on a substrate 101, and a core layer 103 having a refractive index larger than the lower cladding layer 102 is formed on the lower cladding layer 102. The lower cladding layer 102 and the core layer 103 are made of a silica layer, and elements such as, for example, $GeO_2$, and $P_2O_5$ are added to the core layer 103 to have a higher refractive index than the lower cladding layer 102.

Referring to FIG. 1B, a metal pattern 104 is formed on the core layer 103, and then an exposed portion of the core layer 103 is etched through an etching process using the metal pattern 104 as a mask to form a core 103a.

Referring to FIG. 1C, after the metal pattern 104 is removed, an upper cladding layer 105 having the same refractive index as the lower cladding layer 102 is formed on the entire surface of the resultant structure having the core 103a to complete the planar optical waveguide as shown in FIG. 2.

As described above, the conventional planar optical waveguide has an arrangement in which the lower and upper cladding layers 102 and 105 are formed around the core 103a with refractive indices lower than the core 103a, and an optical signal is guided through the core 103a by a principle that light is refracted and focused into a portion having a large refractive index. Therefore, elements such as $GeO_2$, and $P_2O_5$ are added to the core layer 103 to increase the refractive index, thus generating a concentration gradient between the core 103a and the lower and upper cladding layers 102 and 105.

However, when the elements added to the core layer 103 are externally diffused due to a subsequent high temperature annealing process during the process of fabricating an optical waveguide, a difference of the refractive indices at an interface (A portion) between the core 103a and the lower and upper cladding layers 102 and 105 is reduced so that light guided through the core 103a is scattered at the interface (A portion) to cause a propagation loss.

SUMMARY OF THE INVENTION

The present invention is directed to a planar optical waveguide and a method of fabricating the planar optical waveguide capable of minimizing a propagation loss.

One aspect of the present invention is to provide a planar optical waveguide including: a substrate; a lower cladding layer formed on the substrate; a core formed on the lower cladding layer; a dielectric layer covering the core; and an upper cladding layer formed on the lower cladding layer having the dielectric layer.

Another aspect of the present invention is to provide a method of fabricating an planar optical waveguide including: forming a lower cladding layer and a first dielectric layer on a substrate; after forming a core layer on the first dielectric layer, patterning the core layer and the first dielectric layer; and after forming a second dielectric layer on the entire surface of the resultant structure, forming an upper cladding layer on the second dielectric layer.

The lower cladding layer may be formed to a thickness of 15 to 20 µm using a flame hydrolysis deposition (FHD) method or a plasma enhanced chemical vapor deposition (PECVD) method.

The first and second dielectric layers may be formed to a thickness of 0.01 to 2 µm using a plasma enhanced chemical vapor deposition (PECVD) method.

The first and second dielectric layers may be made of materials having a lower refractive index than lower and upper cladding layers, and the material having the lower refractive index may be amorphous silicon oxide or amorphous silica glass.

The core layer may be formed to a thickness of 4 to 10 µm using a flame hydrolysis deposition (FHD) method or a plasma enhanced chemical vapor deposition (PECVD) method.

The upper cladding layer may be formed using a flame hydrolysis deposition (FHD) method or a plasma enhanced chemical vapor deposition (PECVD) method.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 6 is a plan view showing an example of an optical component using a planar optical waveguide according to the present invention.

DETAILED DESCRIPTION OF PREFERRED EMBODIMENTS

Exemplary embodiments of the present invention will now be described in detail with reference to the accompanying drawings. The following embodiments are described to enable those skilled in the art to obtain a thorough understanding to those skilled in the art, and a variety of modification can be made and it should be noted that the present invention is not limited hereto.

Figure 1A:
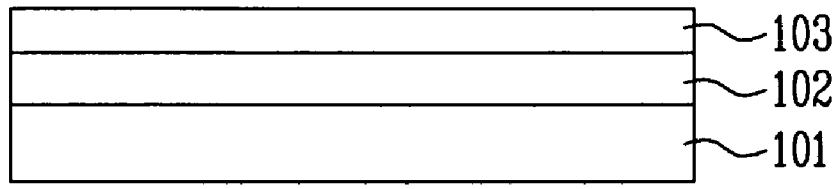
FIGS. 1A to 1C are cross sectional views illustrating a method of fabricating a conventional planar optical waveguide.
Figure 1B:
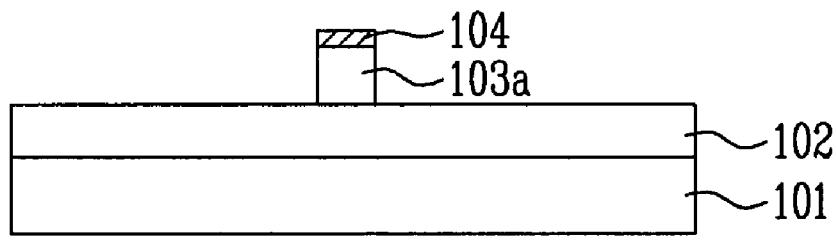
Figure 1C:
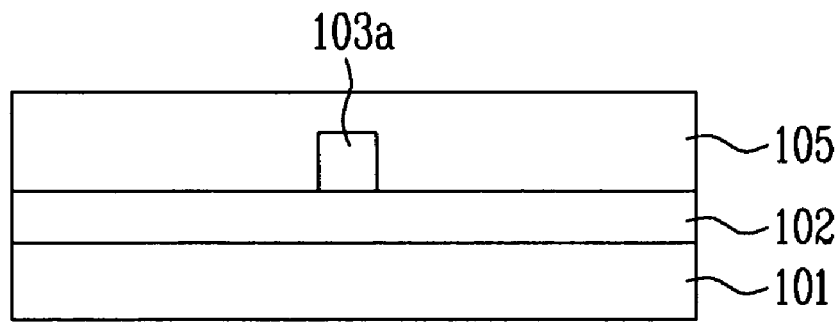
Figure 2:
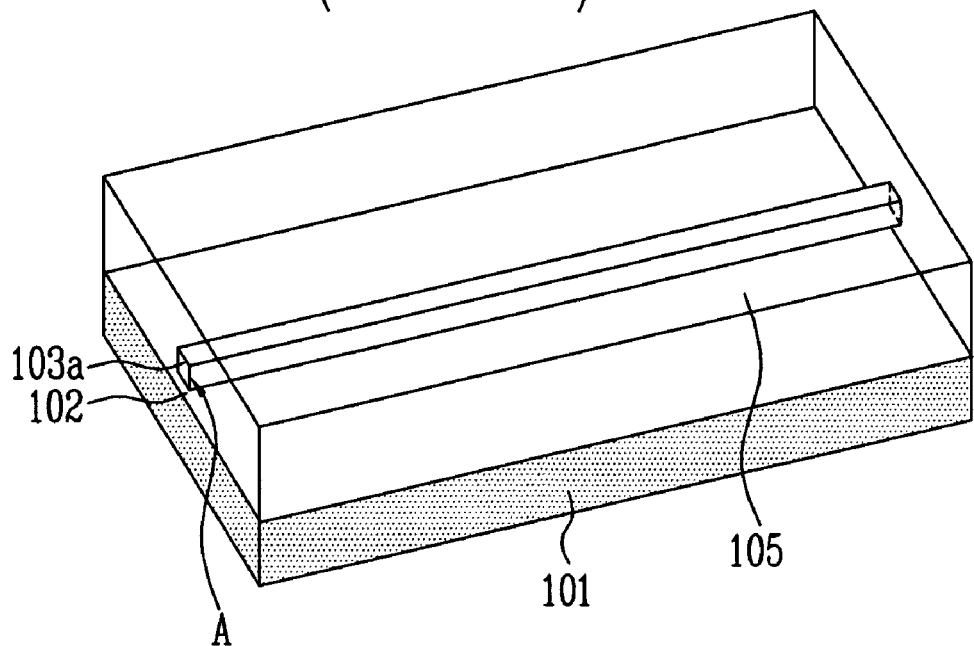
FIG. 2 is a perspective view of a planar optical waveguide fabricated through the conventional method.
Figure 3:
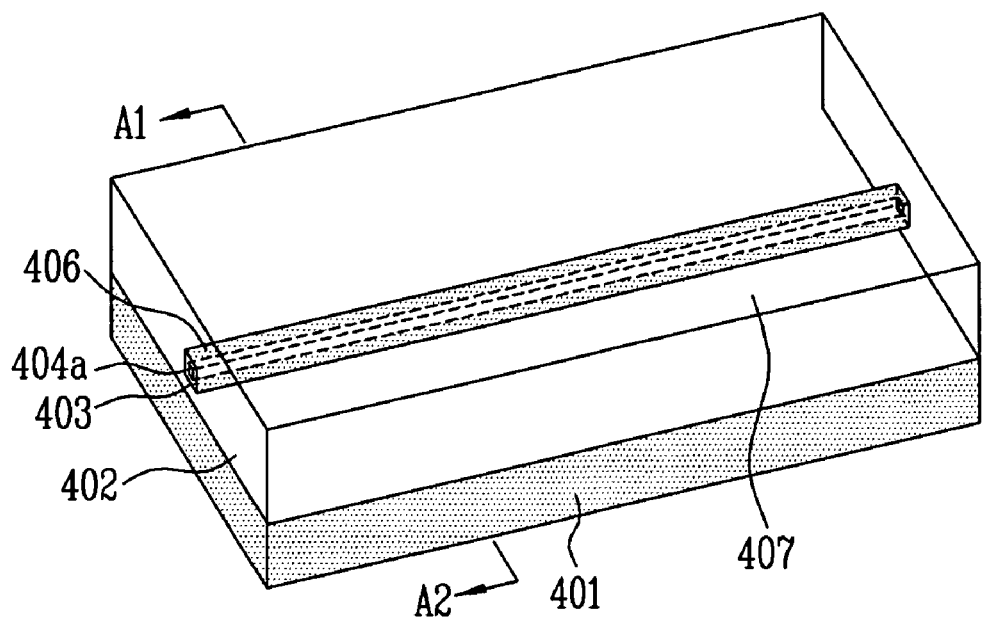
FIG. 3 is a perspective view of a planar optical waveguide according to the present invention.

FIG. 3 is a perspective view of a planar optical waveguide according to the present invention.

A lower cladding layer 402 is formed on a substrate 401, and a core 404a is formed on the lower cladding layer 402. The core 404a is surrounded with a dielectric layer 406, and an upper cladding layer 407 is formed on the lower cladding layer 402 including the dielectric layer 406. In addition, a dielectric layer 403 is also formed between the core 404a and the lower cladding layer 402. Here, the dielectric layers 403 and 406 have lower refractive indices than the lower and upper cladding layers 402 and 407, which are made of, for example, amorphous silicon oxide or amorphous silica glass.

Figure 4:
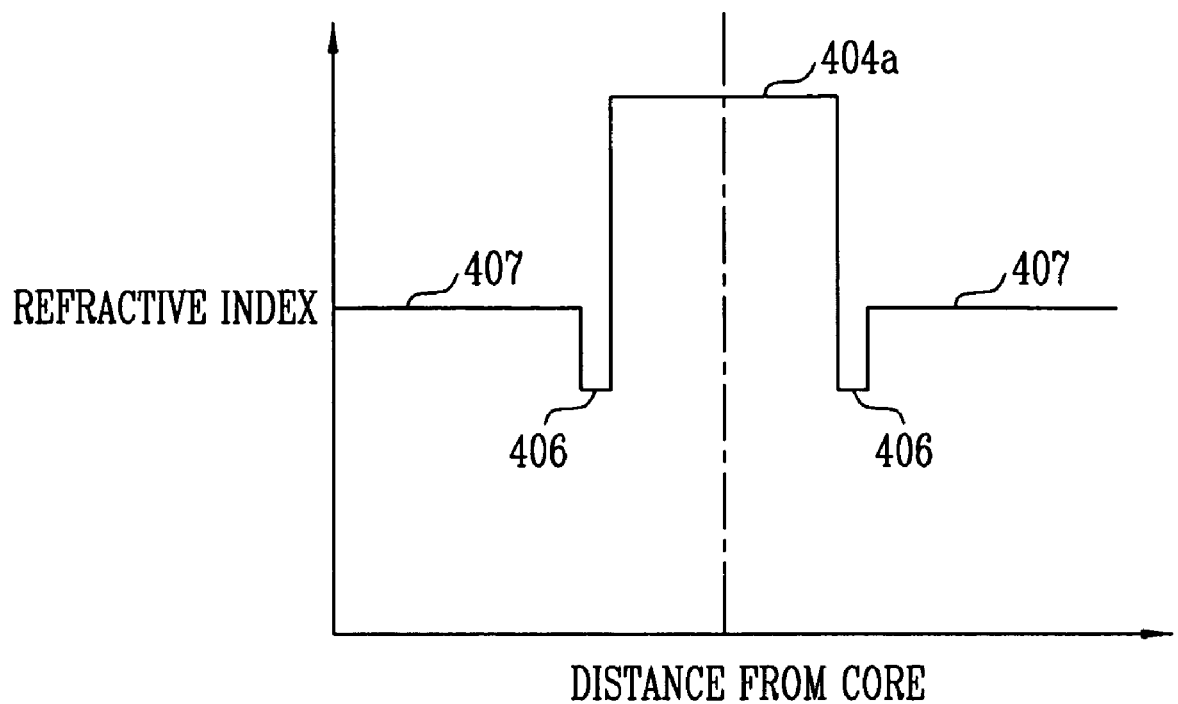
FIG. 4 is a diagram showing a distribution of refractive indices for a cross section taken along line A1-A2 of FIG. 3.

Therefore, from a refractive index distribution of a cross section taken along line A1-A2 of FIG. 3, the following formula is applied as shown in FIG. 4: core 404a>upper cladding layer 407>dielectric layer 406. Here, the dielectric layers 403 and 406, which have the lowest refractive index are placed between the core 404a and the lower and upper cladding layers 402 and 407.

When the dielectric layers 403 and 406 are made of pure silicon oxide ($SiO_2$), a refractive index will be about 1.44 at a wavelength of 1550 nm, which is lower than the core 404a having a refractive index of more than 1.45 and the lower and upper cladding layers 402 and 407 having a refractive index of more than 1.4450. Therefore, a difference of refractive indices at the interface between the core 404a and the lower and upper cladding layers 402 and 407 increases so that light is densely focused into the core 404a, thereby forming a single mode having a strong energy to minimize a propagation loss.

Embodiments of a method of fabricating a planar optical waveguide according to the present invention having an arrangement described above are described with reference to FIGS. 5A to 5G.

EMBODIMENT 1

Figure 5A:
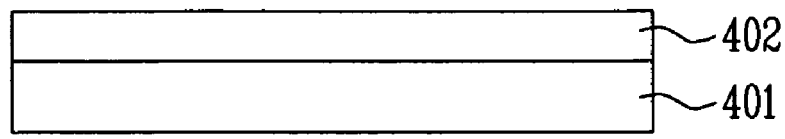
FIGS. 5A to 5G are cross sectional views illustrating a method of fabricating the planar optical waveguide according to the present invention.

Referring to FIG. 5A, a lower cladding layer 402 is formed to a thickness of 15 to 20 μm on a substrate 401 made of silicon or quartz using a flame hydrolysis deposition (FHD) method.

When the FHD method is used, toxic chloride gases such as $SiCl_4$, $GeCl_4$, $POCl_3$, and $BCl_3$ react with transport materials in a high-pressure and high-temperature torch to form an oxide corpuscle, and then a high-density glass film may be obtained by performing an annealing process and adjusting a refractive index.

Figure 5B:
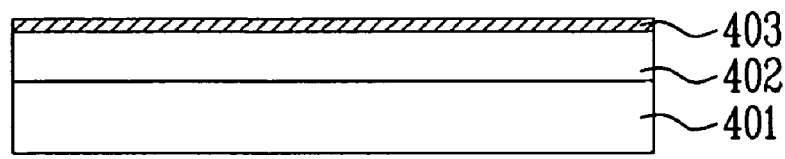

Referring to FIG. 5B, a lower dielectric layer 403 is made of amorphous silicon oxide or amorphous silica glass with a thickness of less than 2 μm, and preferably, 0.01 to 2 μm using a plasma enhanced chemical vapor deposition (PECVD) method. When the silicon oxide is deposited by the PECVD method, reactive gases such as $SiH_4$, and $N_2O$ are used at 200° C. to 300° C. Alternatively, gases such as tetraethoxysilane (TEOS), $SiH_2Cl_2$, and oxygen may be used. Here, in order to have a refractive index difference between the core and the peripheral layer (clad), a flow of $PH_3$, $B_2H_6$ and the like is adjusted to control contents of $P_2O_3$, and $B_2O_5$ contained therein.

Figure 5C:
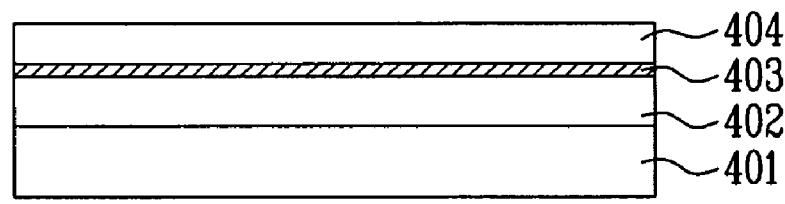

Referring to FIG. 5C, a core layer 404 is formed on the lower dielectric layer 403 to have a thickness of 5 to 10 μm using an FHD method. Through the FHD method, when an oxide corpuscle is generated by the flame hydrolysis reaction with the gases such as $SiCl_4$, $GeCl_4$, $POCl_3$, and $BCl_3$, annealing is performed. Here, the content of added atoms is adjusted to control the difference between refractive indices to be about 0.2% to 2.0%.

Figure 5D:
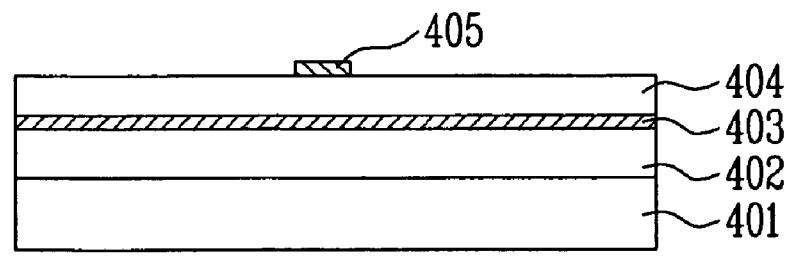

Referring to FIG. 5D, metal such as Cr or Al is deposited on the core layer 404 to have a thickness of 2000 to 3000 Å, and then patterned using a lithography process to form a metal pattern 405.

Figure 5E:
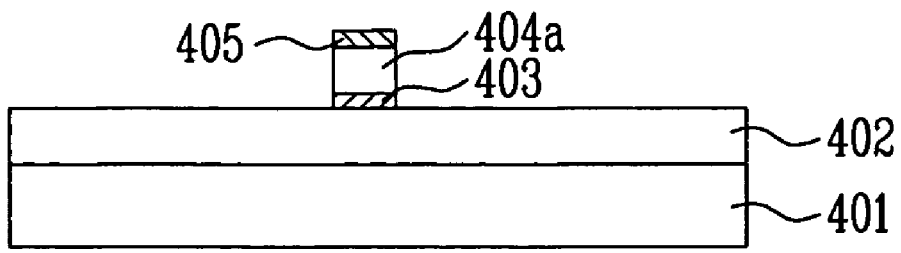

Referring to FIG. 5E, the core layer 404 and the lower dielectric layer 403 are etched by an etching process using the metal pattern 405 as a mask to form a stripe type core 404a in a rectangle or circle shape. The core layer 404 is etched using an inductive coupled plasma (ICP) method, and $CF_4$ and $O_2$ are used as an etching gas. Here, an etching depth is determined to be about 7 to 12 μm and a sidewall of the etched core layer 404 has a vertical slope of more than 86 degrees.

Figure 5F:
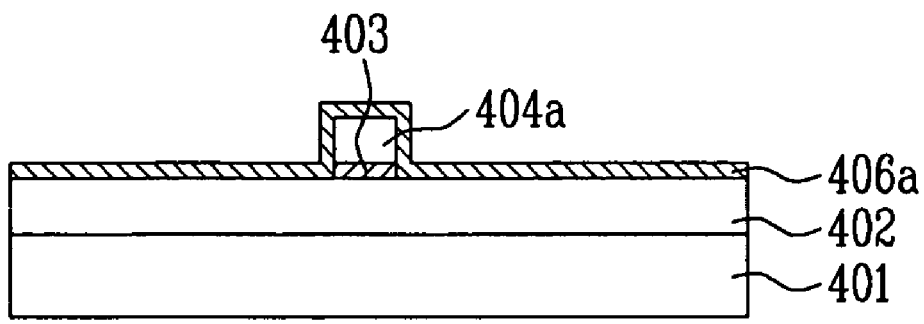

Referring to FIG. 5F, after removing the metal pattern 405, an upper dielectric layer 406 having a thickness of less than 2 μm is formed using a PECVD method. The upper dielectric layer 406 is made of amorphous silicon oxide, amorphous silica glass, and the like, and the same process as in fabricating the lower dielectric layer 403 can be used.

Figure 5G:
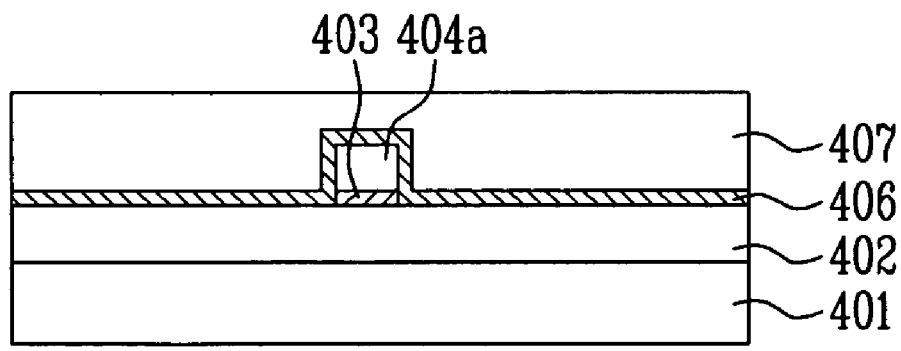

Referring to FIG. 5G, an upper cladding layer 407 having the same refractive index as the lower cladding layer 402 is formed on the entire surface of the resultant structure using an FHD method. After forming the upper cladding layer 407, annealing process is performed at a temperature of more than 1000° C.

EMBODIMENT 2

According to an embodiment of the present invention, the lower cladding layer 402, the core layer 404, and the upper cladding layer 407 are formed using a PECVD method. With the PECVD method, a waveguide can be effectively prevented from being deformed by a temperature because a processing temperature is lower than the case using an FHD method.

Referring to FIG. 5A, the lower cladding layer 402 is formed on the substrate 401 made of silicon or quartz to have a thickness of 15 to 20 μm using a PECVD method.

Referring to FIG. 5B, the lower dielectric layer 403 is formed on the lower cladding layer 402 to a thickness of less than 2 μm, and preferably, less than 0.01 to 2 μm using the PECVD method. The lower dielectric layer 403 is made of amorphous silicon oxide or amorphous silica glass. The silicon oxide is formed using $SiH_4$ and $N_2O$ as a reactive gas at a temperature of 200° C. to 300° C., or alternatively, using a gas such as TEOS, $SiH_2Cl_2$, and oxygen. Here, in order to have a refractive index difference between the core and the peripheral layer (clad), a flow of $PH_3$, $B_2H_6$ and the like is adjusted to control contents of $P_2O_3$, or $B_2O_5$ contained therein.

Alternatively, the lower dielectric layer 403 may be formed of an essential component of $SiO_2$ by thermal oxidizing the surface of the lower cladding layer 402 in a thickness of 15 to 20 μm.

Referring to FIG. 5C, the core layer 404 is formed on the lower dielectric layer 403 to a thickness of 5 to 10 μm using the PECVD method. Content of the atoms contained herein is adjusted to control the difference of the refractive index to be about 0.2% to 2.0%.

Referring to FIG. 5D, metal such as Cr and Al is deposited on the core layer 404 to a thickness of 2000 to 3000 Å, and then patterned using a lithography process to form the metal pattern 405.

Referring to FIG. 5E, the core layer 404 and the lower dielectric layer 403 are etched by an etching process using the metal pattern 405 as a mask, so that the stripe type core 404a is formed in a rectangle or circle shape. The core layer 404 is etched using an ICP method, and $CF_4$ and $O_2$ are used as an etching gas. Here, an etching depth is determined to be 7 to 12 μm, and a sidewall of the etched core layer 404 has a vertical slope of more than 86 degrees.

Referring to FIG. 5F, after removing the metal pattern 405, the upper dielectric layer 406 having a thickness of less than 2 μm is formed using the PECVD method. The upper dielectric layer 406 is made of amorphous silicon oxide, amorphous silica glass, and the like, and the same process as in fabricating the lower dielectric layer 403 can be used.

Referring to FIG. 5G, the upper cladding layer 407 having the same refractive index as the lower cladding layer 402 is formed on the entire surface using an FHD method. After forming the upper cladding layer 407, an annealing process is performed at a temperature of more than 1000° C.

In the embodiments 1 and 2, the process of forming the lower dielectric layer 403 may be omitted to reduce the manufacturing costs. In this case, a lesser propagation loss may be generated compared to the case where the entire core 404a is surrounded by the dielectric layers 403 and 406.

In addition, according to the embodiments 1 and 2, the lower dielectric layer 403 and the upper dielectric layer 406 are formed by the PECVD method, and may also be formed using a sputtering method. In this case, a conventional water-cooling sputter gun of the sputtering target is used, a diameter of a target glass with adjusted refractive index is preferably 2 to 4 inches (50 to 100 mm), and a thickness is ¼ inch (6 mm). When a process proceeds at a low pressure of 1 to 2 mm Torr, dispersion of a sputtering particle can be reduced. When the pressure is reduced, a deposition rate is reduced to less than 100 Å/hr, which makes it difficult to deposit a thick film, so that this is applied to the deposition of the thin film of less than 1 μm.

As described above, according to the present invention, a difference of the refractive index between the core 404a and the lower and upper cladding layers 402 and 407 is increased due to the lower and upper dielectric layers 403 and 406, so that the guided light is further densely focused into the core 404a to form a single mode having a strong energy. Therefore, a propagation loss is minimized.

FIG. 6 is a plan view showing an example of an optical component in which a planar optical waveguide according to the present invention is applied, and a linear optical waveguide 602, an 8-split optical splitter 603 and an 8-channel wavelength multiplexer 604 are integrated on a substrate 601.

When the optical component was fabricated using the conventional planar optical waveguide, the linear optical waveguide showed a propagation loss of 10 dB/cm, the 8-split optical splitter 10.5 dB, and the 8-channel wavelength multiplexer about 5.0 dB, including a connection loss, and a crosstalk was 33 dB. However, when the planar optical waveguide of the present invention was applied to fabricate the optical component, the linear optical waveguide 602 showed a propagation loss of 0.5 dB/cm, the 8-split optical splitter 603 9.5 dB, and the 8-channel wavelength multiplexer 604 4.3 dB, and the crosstalk was as low as 37 dB.

As described above, according to the present invention, a thick dielectric layer having a low refractive index between the core and the clad is formed to increase a difference of the refractive index between the core and the clad. Therefore, the guided light is further densely focused so that a single mode having a strong energy is formed to minimize a propagation loss.

The planar optical waveguide of the present invention can be applied to various single optical passive components such as an optical distributor, an optical coupler, a wavelength multiplexer, an optical filter, an optical amplifier, an optical attenuator, and an optical switch, and optical active components such as a light receiving device, and a light emitting device, are also applied to an optical platform into which the optical passive component and the optical active component are integrated, and various optical modules using the optical platforms.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

What is claimed is:

1. A planar optical waveguide comprising:
    a substrate;
    a lower cladding layer having a refractive index of n(l) formed on the substrate;
    a core formed on the lower cladding layer having a refractive index of n(c); and
    a dielectric material of silicon oxide or silica glass having a refractive index of n(d) covering at least the core; and
    an additional dielectric material formed between the core and the lower cladding layer;
    an upper cladding layer having a refractive index of n(u) formed on the lower cladding layer and the dielectric material,
    wherein n(l) substantially equals n(u), and
    wherein n(c)>n(u)>n(d).

2. The planar optical waveguide according to claim 1, wherein the dielectric layer is made of one of amorphous silicon oxide and amorphous silica glass.

3. A method of fabricating a planar waveguide, comprising:
    forming a lower cladding layer having a refractive index of n(l) and a first dielectric layer of silicon oxide or silica glass having a refractive index of n(d1) on a substrate;
    after forming a core layer having a refractive index of n(c) on the first dielectric layer, patterning the core layer and the first dielectric layer; and after forming a second dielectric layer having a refractive index of n(d2) on the surface of the core layer and the lower cladding layer, forming an upper cladding layer having a refractive index of n(u) on the second dielectric layer, wherein n(d1) substantially equals n(d2), wherein n(l) substantially equals n(u), and wherein n(c)>n(u)>n(d2).

4. The method of claim 3, wherein the lower cladding layer is formed to a thickness of 15 to 20 μm using a flame hydrolysis deposition (FHD) method or a plasma enhanced chemical vapor deposition (PECVD) method.

5. The method of claim 3, wherein the first and second dielectric layers are formed to a thickness of 0.01 to 2 μm using a plasma enhanced chemical vapor deposition (PECVD) method.

6. The method of claim 3, wherein the first or second dielectric layer is made from one of amorphous silicon oxide and amorphous silica glass.

7. The method of claim 3, wherein the core layer is formed to a thickness of 4 to 10 μm using a flame hydrolysis deposition (FHD) method or a plasma enhanced chemical vapor deposition (PECVD) method.

8. The method of claim 3, wherein the upper cladding layer is formed by a flame hydrolysis deposition (FHD) method or a plasma enhanced chemical vapor deposition (PECVD) method.

9. The method of claim 3, further comprising after forming the upper cladding layer, annealing the upper cladding layer.

* * * * *